United States Patent
Jung

(10) Patent No.: US 9,015,491 B2
(45) Date of Patent: Apr. 21, 2015

(54) METHOD AND APPARATUS FOR MANAGING PRIVATE DATA IN MULTIFUNCTION PERIPHERAL

(75) Inventor: Eun-Young Jung, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 845 days.

(21) Appl. No.: 11/493,637

(22) Filed: Jul. 27, 2006

(65) Prior Publication Data

US 2007/0043953 A1   Feb. 22, 2007

(30) Foreign Application Priority Data

Aug. 16, 2005   (KR) .............................. 2005-0074924

(51) Int. Cl.
*H04L 9/32*   (2006.01)
*G06F 21/62*   (2013.01)
*G06F 21/78*   (2013.01)

(52) U.S. Cl.
CPC ............ *G06F 21/6245* (2013.01); *G06F 21/78* (2013.01)

(58) Field of Classification Search
CPC .............................. G06F 21/6245; G06F 21/78
USPC .......... 709/211, 217, 227, 248, 249; 713/193, 713/155, 150, 161, 168, 169; 726/2, 4, 17, 726/21, 26; 711/4, 100, 111, 112, 156; 380/229, 232, 241, 247, 258
See application file for complete search history.

(56) References Cited

U.S. PATENT DOCUMENTS 5,864,670 A * 1/1999 Hayashi et al. ............... 709/204
(Continued)

FOREIGN PATENT DOCUMENTS

| JP | 2004-328467 | 11/2004 |
| KR | 10-2002-0060446 | 7/2002 |
| KR | 10-2003-0050473 | 6/2003 |
| WO | 94/03994 A1 | 2/1994 |

OTHER PUBLICATIONS

Kirk Mcelhearn, "Creating User Accounts from the Command Line", www.mcelhearn.com Dec. 13, 2004, http://web.archive.org/web/20041213040902/www.mcelhearn.com/article.php?story=2004110211244242.

(Continued)

*Primary Examiner* — Brandon Hoffman
*Assistant Examiner* — Nega Woldemariam
(74) *Attorney, Agent, or Firm* — Roylance, Abrams, Berdo & Goodman, L.L.P

(57) ABSTRACT

A method and apparatus is provided for managing private data, such as a phone book, in a multifunction peripheral (MFP) used by multiple users. The method involves receiving user information and performing user authentication, and reading data stored in a user area allocated to the authenticated user in a storage unit divided into a number of user areas. Accordingly, when private data is managed in an MFP used by multiple users, by dividing a storage unit in which data is stored into a number of user areas, allocating the divided user areas to users, and allowing a user to access only a user area allocated to the user through an authentication process, the private data can be fully prevented from being accessed by other users, and it will be unlikely for a user to be confused because of other user data.

15 Claims, 3 Drawing Sheets

(56) References Cited

U.S. PATENT DOCUMENTS

| | | | |
|---|---|---|---|
| 6,452,691 B1* | 9/2002 | Marshall | 358/1.15 |
| 2004/0205099 A1* | 10/2004 | Hagiwara | 709/200 |
| 2006/0048234 A1* | 3/2006 | Imaizumi et al. | 726/27 |
| 2006/0059570 A1* | 3/2006 | Kawabuchi et al. | 726/28 |
| 2006/0095433 A1* | 5/2006 | Kano | 707/10 |

OTHER PUBLICATIONS

Eric S. Raymond, "The Unix and Internet Fundamentals HOWTO", vol. 6, Mar. 6, 2000, 17 pages.

Office Action dated Jul. 8, 2013 issued by the European Patent Office in counterpart European Application No. 06118348.9.

* cited by examiner

PHONE BOOK
1. snow
: 123-4567
2. tree
: 125-1111
3. sumsung
: 031-2020

PHONE BOOK
1. dell
: 111-1111
2. hp
: 222-2222
3. Tom
: 82-31-1111

METHOD AND APPARATUS FOR MANAGING PRIVATE DATA IN MULTIFUNCTION PERIPHERAL

PRIORITY

This application claims the benefit under 35 U.S.C. §119(a) of Korean Patent Application No. 10-2005-0074924, filed Aug. 16, 2005, in the Korean Intellectual Property Office, the entire disclosure of which is hereby incorporated by reference.

BACKGROUND OF THE INVENTION

1. Field of the Invention

The present invention relates to a method and apparatus for managing a user's data. More particularly, the present invention relates to a method and apparatus for storing private data in memory and managing it in a multifunction peripheral (MFP) used by a plurality of users.

2. Description of the Related Art

A traditional multifunction peripheral (MFP) can be used as a scanner to read text of images printed on paper, a facsimile to transfer data to another place via a communication line, and a printer to print data input from a personal computer (PC). That is, the MFP is a multi-function terminal obtained by combining single terminal devices, such as a conventional scanner, a conventional facsimile, and a conventional printer. The MFP can also have a PC interface for communication with a PC.

The MFP includes a storage unit for storing private data such as usage history of information regarding scanned or printed pages according to a user's request, a phone book consisting of a list of telephone and facsimile numbers, a user's private option information, and a users' private ID/password.

Since the storage unit is shared by all users accessing the MFP, there is a security problem in that private data may be available to other users. To prevent unauthorized access, a password must be established for each item of stored data. However, even in this case, unauthorized access to a user's data cannot be fully prevented. In addition, since data of different users are mixed and stored, users can be confused when using the data.

SUMMARY OF THE INVENTION

The present invention provides a method and apparatus for managing private data in a multifunction peripheral (MFP) used by a plurality of users in order to fully prevent unauthorized access to the private data. Exemplary embodiments of the present invention use a storage unit of which portions are divided and allocated to users in advance when the private data is stored and managed.

According to an aspect of an exemplary embodiment of the present invention, there is provided a method of managing private data, the method comprising receiving user information and performing user authentication, and reading data stored in a user area allocated to an authenticated user in a storage unit divided into a predetermined number of user areas.

Exemplary embodiments provide that the storage unit may not allow the authenticated user to access user areas except the user area allocated to that authenticated user. If a user area allocated to the authenticated user does not exist in the storage unit, the method may further comprise allocating a user area unallocated to the other users among the divided user areas to the authenticated user.

The method may further comprise receiving data input by the authenticated user, and storing the input data in the user area allocated to the authenticated user in the storage unit.

In performing user authentication, the user authentication may be performed by receiving an ID and password input by a user, and the data stored in the storage unit may comprise at least one of a facsimile number list, a phone number list, an email address list, a prefix dial, a user ID, and a user password.

The method may further comprise displaying the read data.

According to another aspect of exemplary embodiments of the present invention, there is provided an apparatus for managing private data. The apparatus comprises a user authentication unit receiving user information and performing user authentication, a storage unit, which is divided into a number of user areas, and configured to store user data in each of the divided user areas, and allow an authenticated user to access only a user area allocated to the authenticated user among the divided user areas. The apparatus further comprises a controller for reading data stored in the user area allocated to the authenticated user in the storage unit. The controller may allocate a user area unallocated to other users among the divided user areas to the authenticated user if a user area allocated to the authenticated user does not exist in the storage unit, and store data input by the authenticated user in the user area allocated to the authenticated user in the storage unit. The user authentication unit may perform user authentication by receiving an ID and password input by a user, and the data stored in the storage unit may comprise at least one of a facsimile number list, a phone number list, an email address list, a prefix dial, a user ID, and a user password. The controller may store data so that information on a user area allocated to a user in the storage unit and information on a user to which the user area is allocated correspond to each other.

According to an aspect of exemplary embodiments of the present invention, there is provided a computer readable medium having recorded thereon a computer readable program for performing the method of managing private data.

BRIEF DESCRIPTION OF THE DRAWINGS

The above and other exemplary features and advantages of the present invention will become more apparent by describing in detail certain exemplary embodiments thereof with reference to the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
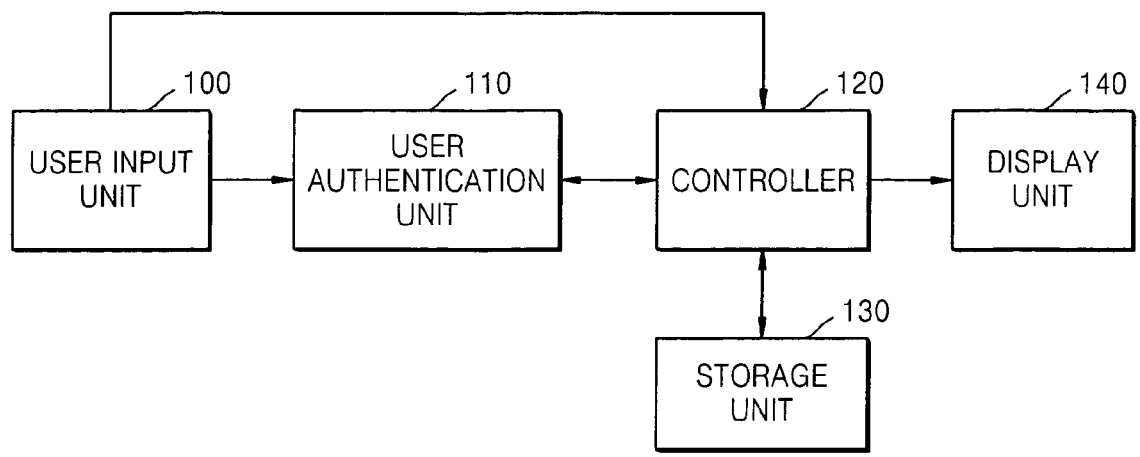
FIG. 1 is a block diagram of an apparatus for managing private data according to an exemplary embodiment of the present invention.
Figure 5:
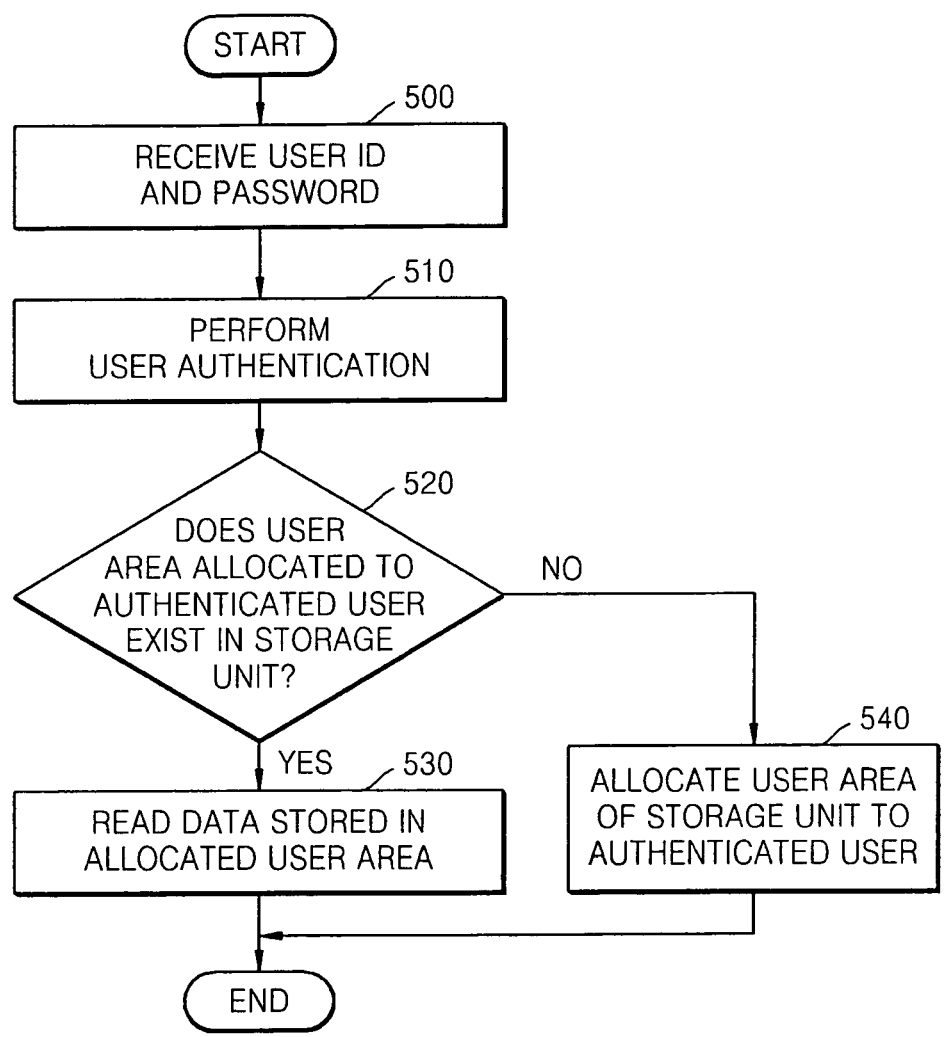
FIG. 5 is a flowchart illustrating a method of managing private data according to an exemplary embodiment of the present invention.

FIG. 1 is a block diagram of an apparatus for managing private data according to an exemplary embodiment of the present invention. The apparatus illustrated in FIG. 1 comprises a user input unit 100, a user authentication unit 110, a controller 120, a storage unit 130, and a display unit 140. An operation of the apparatus block diagram illustrated in FIG. 1 will now be described with reference to a method of managing private data according to an exemplary embodiment of the present invention, which is illustrated in FIG. 5.

In operation 500, the user input unit 100 receives an ID and password for user authentication provided by a user. In operation 510, the user authentication unit 110 determines whether the user authentication succeeds using the ID and password provided. If the user is not authorized as the result of the user authentication, the display unit 140 indicates that the apparatus cannot be used.

The storage unit 130 can be divided in advance into a number of user areas having the same size. In exemplary implementations of the present invention, the number of divided user areas and the size of each user area cannot be changed. If necessary, the number of the divided user areas and sizes thereof can be changed only by an administrator of the apparatus. The divided user areas are respectively allocated to users using the apparatus.

Figure 2:
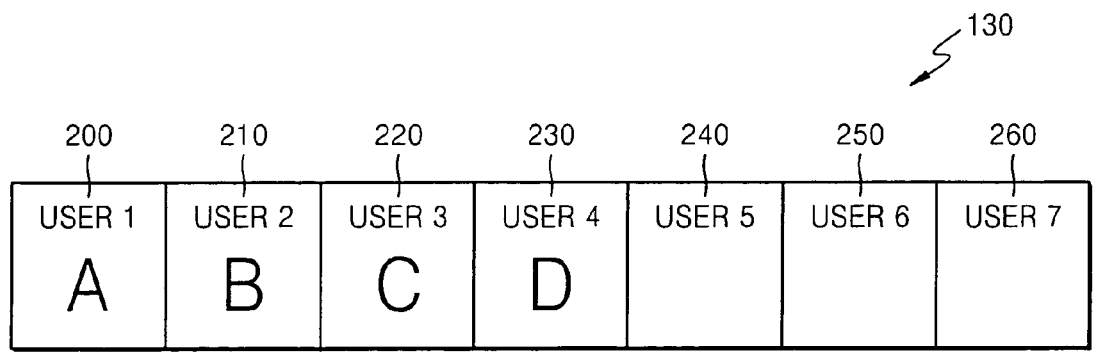
FIG. 2 is an illustration of a storage unit of the exemplary embodiment illustrated in FIG. 1, the storage unit being divided into a plurality of user areas.

FIG. 2 is an illustration of the storage unit 130 divided into 7 user areas in accordance with exemplary embodiments of the present invention. USER 1 area 200 among the 7 divided user areas of the storage unit 130 is allocated to user A and stores therein user A's private data, for example, a phone book containing telephone numbers used by user A. USER 2 area 210 is allocated to user B, USER 3 area 220 to user C, and USER 4 area 230 to user D. USER 5, USER 6, and USER 7 areas 240, 250, and 260 among the 7 divided user areas are reserved. A user's private data stored in each user area of the storage unit 130 can comprise a usage history of information regarding pages scanned or printed according to a user's request, a phone book comprising a list of telephone and facsimile numbers, a user's private option information, a prefix dial stored by a user, and a users' private ID and password for using a specific function, such as email server access.

If the user authentication succeeds, the controller 120 receives information regarding the user from the user authentication unit 10 and determines whether a user area allocated to the authenticated user exists in the storage unit 130 in operation 520. In exemplary implementations the controller 120 stores a table in which information regarding each user comprises information regarding a user area allocated to the user in the storage unit 130, and operation 520 is performed using the stored table. In exemplary implementations the table stores each user ID and identification information, or location of a user area allocated to the user in the storage unit 130.

The table, comprising information regarding area allocation, may be stored in the storage unit 130, and in this case, the controller 120 performs operation 520 by reading the table from the storage unit 130. In addition, when a divided user area of the storage unit 130 is allocated to a new user, or when a user to which a user area is allocated is deleted, it is preferable that the table having the information regarding the area allocation be updated accordingly.

If a user area allocated to the authenticated user exists in the storage unit 130 as the result of the determination in operation 520, the controller 120 accesses the user area allocated to the authenticated user and reads data stored in the user area in operation 530. The controller 120 cannot access, that is, read from or write to, user areas allocated to other users among the divided user areas of the storage unit 130.

If a user area allocated to the authenticated user does not exist in the storage unit 130 as the result of the determination in operation 520, the controller 120 allocates a user area unallocated to any user among the divided user areas of the storage unit 130 to the authenticated user in operation 540. For example, in exemplary implementations the first user area among the USER 5, USER 6, and USER 7 areas 240, 250, and 260 unallocated to any other user among the user areas of the storage unit 130 of FIG. 2 be allocated to the authenticated user.

If a user wants to use data stored in the storage unit 130, the controller 120 accesses a user area allocated to the user among the divided user areas of the storage unit 130 and reads the data requested by the user. The display unit 140 displays the data read by the controller 120 on a screen such that the user can see the data.

Figures 3A, 3B, 4:
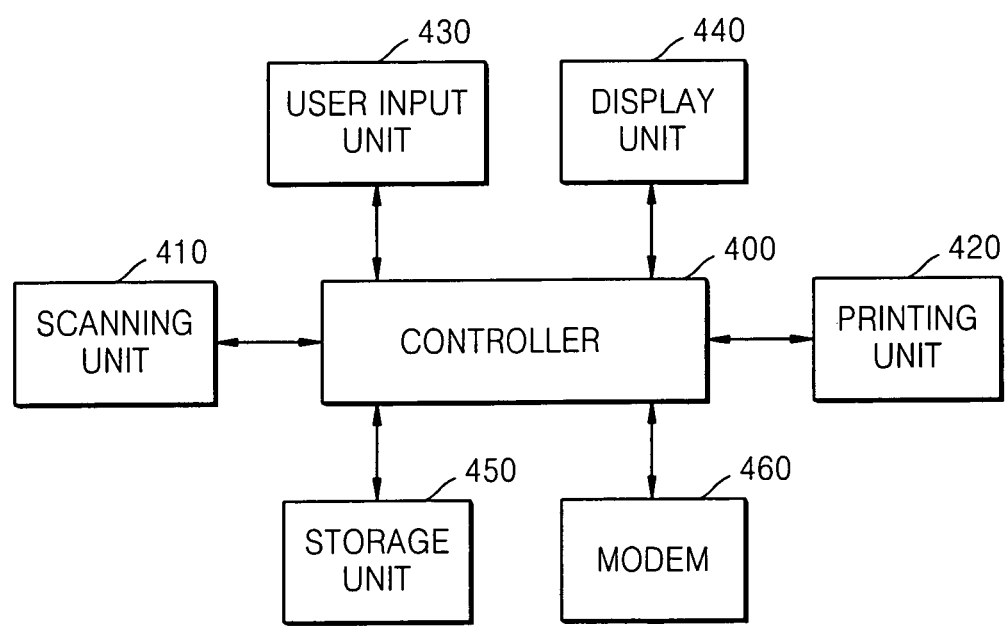
FIGS. 3A and 3B illustrate examples of phone books for individual users according to exemplary embodiments of the present invention.
FIG. 4 is a block diagram of an MFP using a method of managing private data according to an exemplary embodiment of the present invention.

FIGS. 3A and 3B illustrate examples of phone books for individual users stored in the storage unit 130 in accordance with exemplary embodiments of the present invention. FIG. 3A is a phone book comprising telephone or facsimile numbers stored by user A, and the phone book is stored in the USER 1 area 200 among the divided user areas of the storage unit 130 illustrated in FIG. 2. FIG. 3B is a phone book comprising telephone or facsimile numbers stored by user B, and the phone book is stored in the USER 2 area 210 among the divided user areas of the storage unit 130 illustrated in FIG. 2. If user A uses the apparatus after passing the user authentication, the controller 120 can access only the USER 1 area 200 among the divided user areas of the storage unit 130, and therefore, it is impossible that the phone book of user B, illustrated in FIG. 3B, is accessible to user A.

When a user requests storage of specific data, for example, a new facsimile number, the controller 120 stores data input by the user through the user input unit 100 in a user area allocated to the user among the divided user areas of the storage unit 130.

FIG. 4 is a block diagram of an MFP to which a method of managing private data according to an exemplary embodiment of the present invention is applied. The MFP illustrated in FIG. 4 comprises a controller 400, a scanning unit 410, a printing unit 420, a user input unit 430, a display unit 440, a storage unit 450, and a modem 460.

The controller 400 controls of the entire operation of the MFP, the scanning unit 410 reads image data from a document, and the printing unit 420 prints the read image data or image data received from the outside. The modem 460 transmits the read image data or the image data provided from the outside to an external device having a facsimile number provided by a user through the user input unit 430. The display unit 440 displays a current state of the MFP or user selectable option values on a screen, and the storage unit 450 stores software required for the controller 400 to control an operation of the MFP or data to be transmitted/printed.

The controller 400 performs an authentication process of the user using an ID and password provided by the user through the user input unit 430 and reads data stored in a user area allocated to the user among divided user areas of the storage unit 450 only if the user is an authenticated user. If a user's private set option information regarding a function of the MFP exists in the read data, the controller 400 sets function options of the scanning unit 410, printing unit 420, and modem 460 using the user's private set option information. If the user wants to see a phone book, which is a facsimile number list, for facsimile transmission, the controller 400 reads phone book data from the user area allocated to the user and displays the phone book on the screen through the display unit 440.

The present invention may be embodied in a general-purpose computer by running a program from a computer-readable medium, including but not limited to storage media such as magnetic storage media (ROMs, RAMs, floppy disks, magnetic tapes, etc.), optically readable media (CD-ROMs, DVDs, etc.), and carrier waves (transmission over the internet).

As described above, in a method and apparatus for managing private data according to exemplary embodiments of the present invention, by dividing in advance a storage unit in which data is stored into a number of user areas, allocating the divided user areas amongst users, and allowing a user to access only the user area allocated to that user through an authentication process, private data can be fully prevented from being accessed by other users, and it is unlikely for a user to be confused because of data of other users.

While the present invention has been particularly shown and described with reference to certain exemplary embodiments thereof, it will be understood by those of ordinary skill in the art that various changes in form and detail may be made therein without departing from the spirit and scope of the present invention as defined by the following claims and equivalents thereof.

What is claimed is:

1. A method of managing private data in a multifunction peripheral, the method comprising:
   receiving user information;
   performing user authentication;
   determining whether a user area allocated to an authenticated user exists in a storage unit comprising a plurality of predefined user areas by using a table comprising information regarding each user and user area allocated to the user;
   if a user area allocated to the authenticated user exists, reading data stored in the user area allocated to the authenticated user in the storage unit;
   if a user area allocated to the authenticated user does not exist, allocating to the authenticated user a user area unallocated to other users automatically;
   prohibiting the authenticated user from accessing the plurality of user areas in the storage unit other than the user area allocated to the authenticated user; and
   updating the table automatically when the information regarding each user and user area allocated to the user is changed;
   wherein each of the plurality of user areas is allocable to each of a plurality of users which uses the multifunction peripheral.

2. The method of claim 1, further comprising, if the user area allocated to the authenticated user does not exist in the storage unit, allocating to the authenticated user a user area unallocated to other users among the plurality of user areas.

3. The method of claim 1, further comprising:
   receiving data from the authenticated user; and
   storing the data in the user area allocated to the authenticated user in the storage unit.

4. The method of claim 1, wherein the user authentication is performed by authenticating an ID and password provided by a user.

5. The method of claim 1, wherein the data stored in the user area of the storage unit comprises at least one of a facsimile number list, a phone number list, an email address list, a prefix dial, a user ID, and a user password.

6. The method of claim 1, further comprising displaying the data read.

7. The method of claim 1, further comprising printing the data read.

8. The method of claim 1, further comprising allowing the user to access the user area allocated to the authenticated user.

9. A multifunction peripheral for managing private data, the multifunction peripheral comprising:
   a user authentication unit for receiving user information and performing user authentication;
   a storage unit comprising a plurality of predefined user areas, and configured to prohibit an authenticated user from accessing user areas in the storage unit other than the user area allocated to the authenticated user; and
   a controller for
   determining whether the user area allocated to the authenticated user exists in the storage unit by using a table comprising information regarding each user and user area allocated to the user,
   if the user area allocated to the authenticated user exists, reading data stored in the user area allocated to the authenticated user in the storage unit,
   if the user area allocated to the authenticated user does not exist, allocating to the authenticated user a user area unallocated to other users automatically, and
   updating the table automatically when the information regarding each user and user area allocated to the user is changed;
   wherein each of the plurality of user areas is allocable to each of a plurality of users which uses the multifunction peripheral.

10. The multifunction peripheral of claim 9, wherein the controller allocates to the authenticated user a user area unallocated to other users among the plurality of user areas if the user area allocated to the authenticated user does not exist in the storage unit.

11. The multifunction peripheral of claim 9, wherein the controller is configured to store data provided by the authenticated user in the user area allocated to the authenticated user in the storage unit.

12. The multifunction peripheral of claim 9, wherein the user authentication unit is configured to perform user authentication by authenticating an ID and password provided by a user.

13. The multifunction peripheral of claim 9, wherein data stored in the user area of the storage unit comprises at least one of a facsimile number list, a phone number list, an email address list, a prefix dial, a user ID, and a user password.

14. The multifunction peripheral of claim 9, wherein the controller is configured to store data so that information on the user area allocable to an authenticated user and information on a user to which the user area is allocated correspond.

15. The multifunction peripheral of claim 9, further comprising a printing unit for printing the data read.

* * * * *